G. J. BARRETT.
TYPE WRITING AND COMPUTING MACHINE.
APPLICATION FILED AUG. 18, 1911.
1,057,915.
Patented Apr. 1, 1913.
8 SHEETS—SHEET 2.
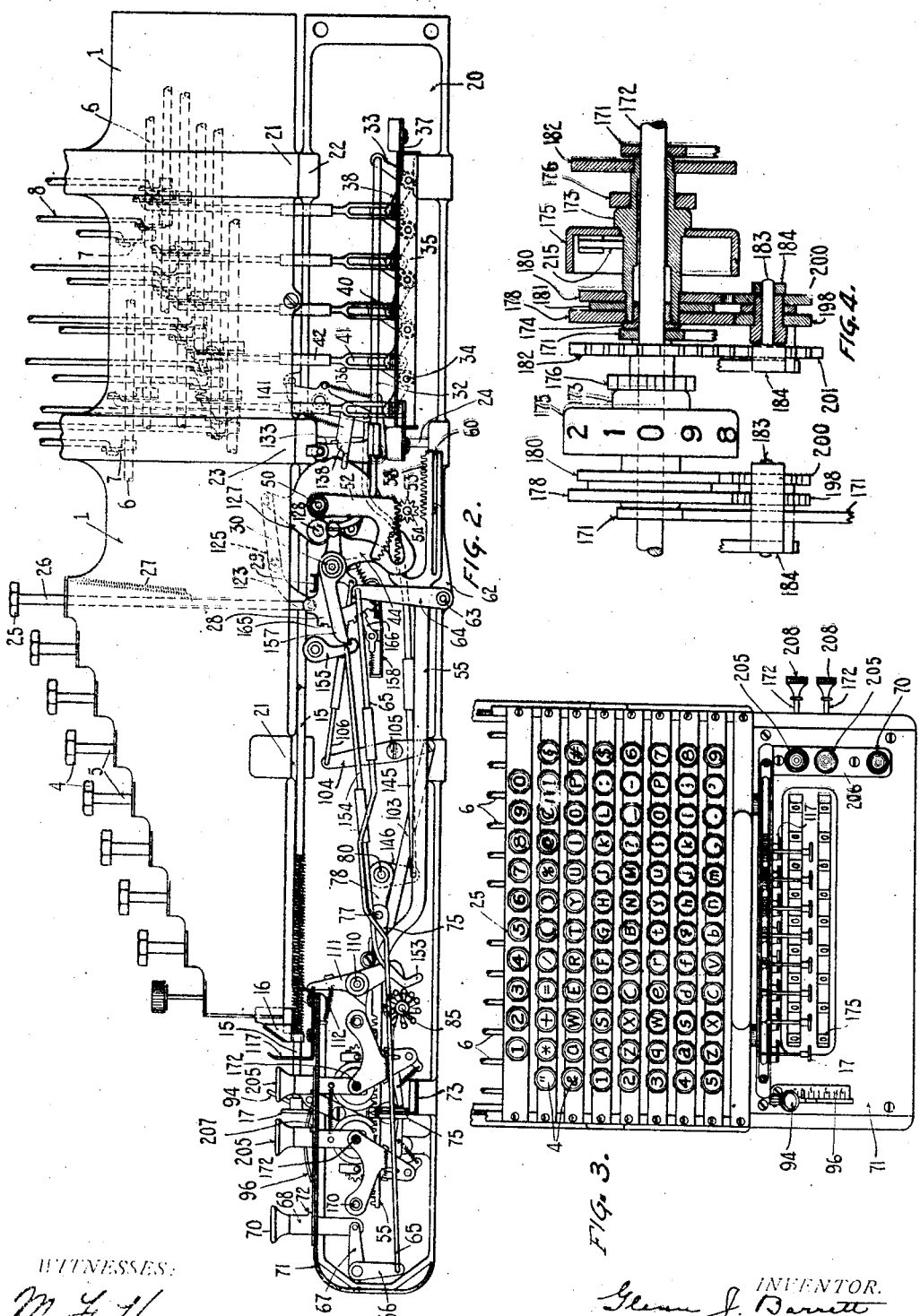
WITNESSES:
INVENTOR.
ATTORNEY.

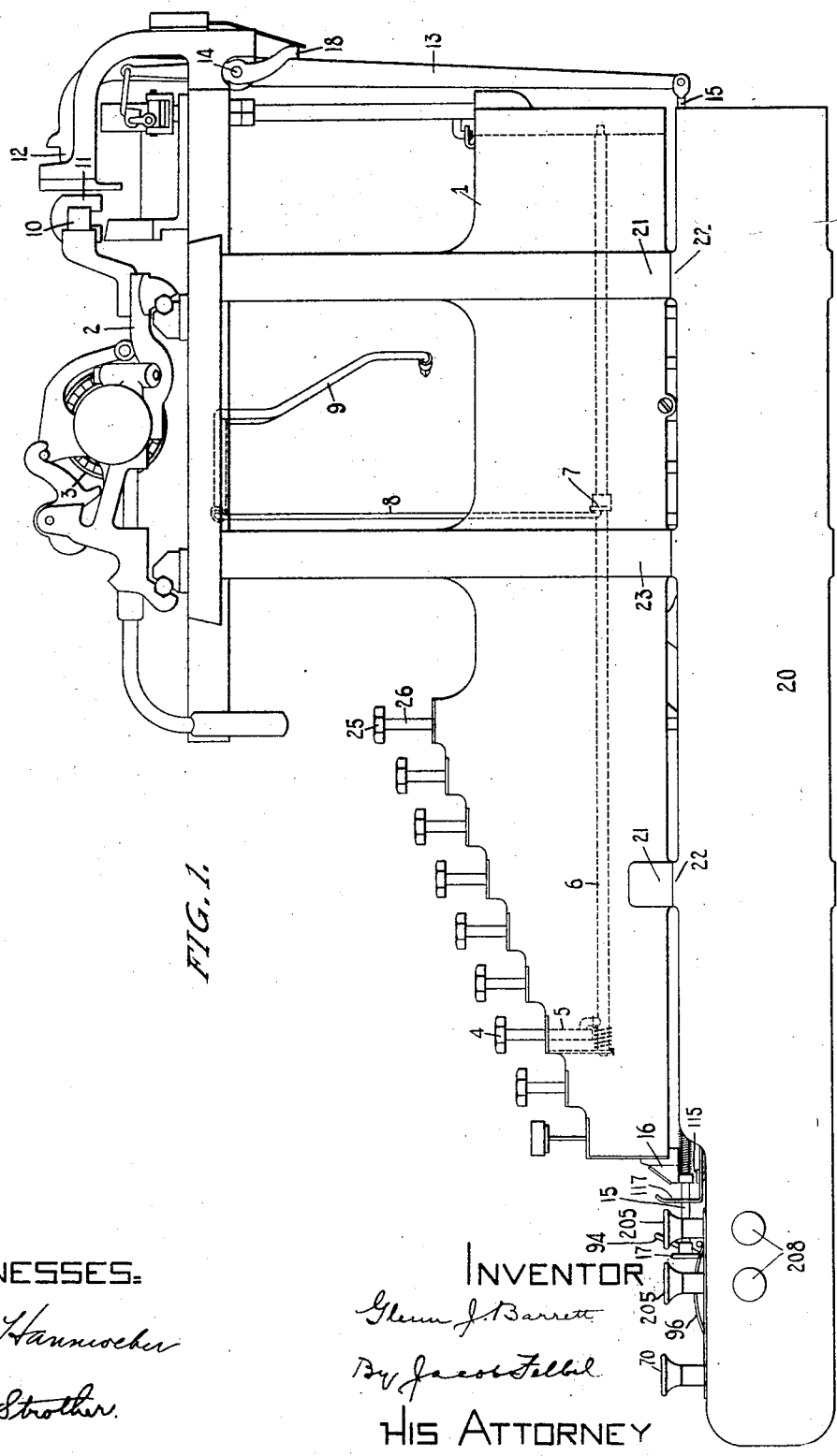

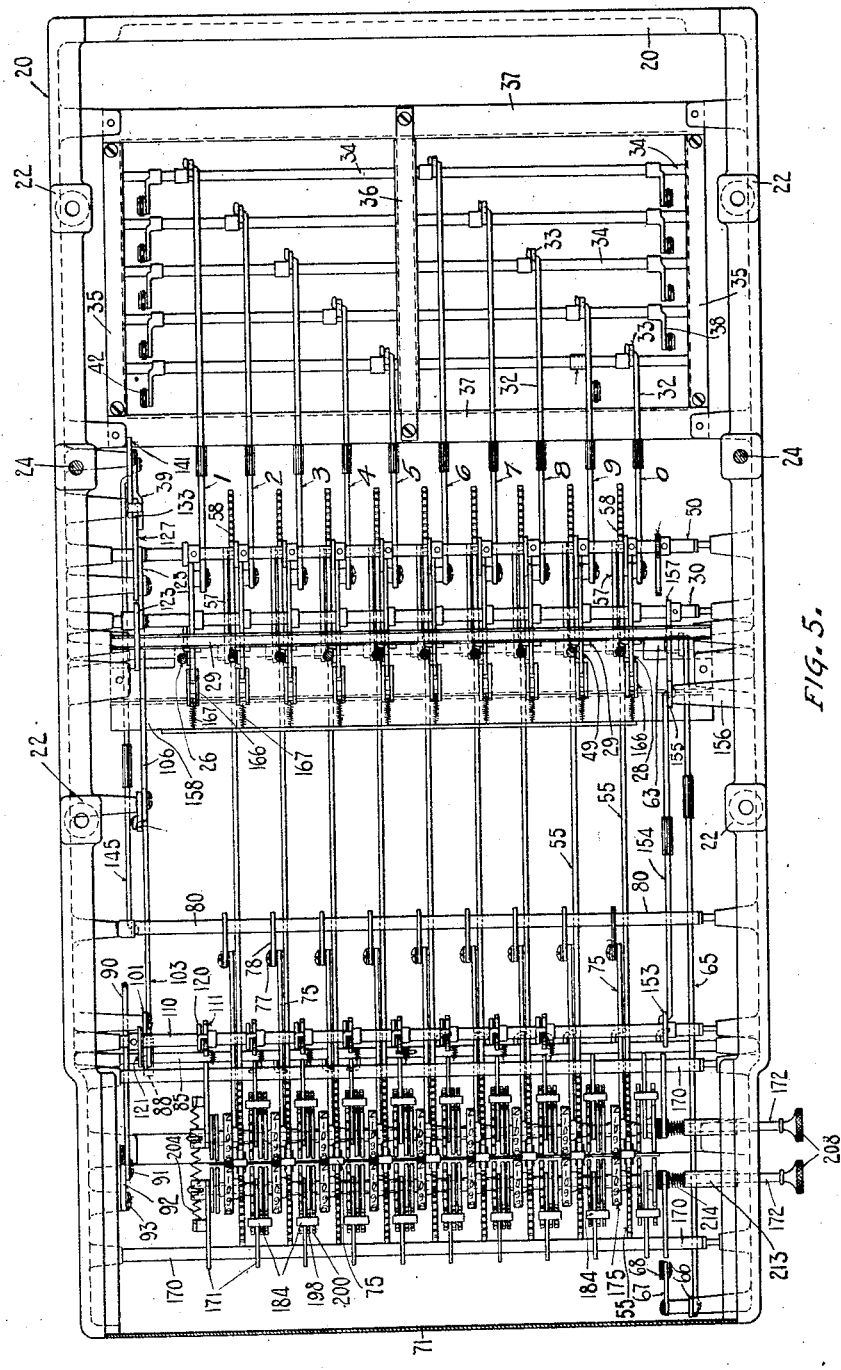

G. J. BARRETT.
TYPE WRITING AND COMPUTING MACHINE.
APPLICATION FILED AUG. 18, 1911.
1,057,915.
Patented Apr. 1, 1913.
8 SHEETS—SHEET 4.
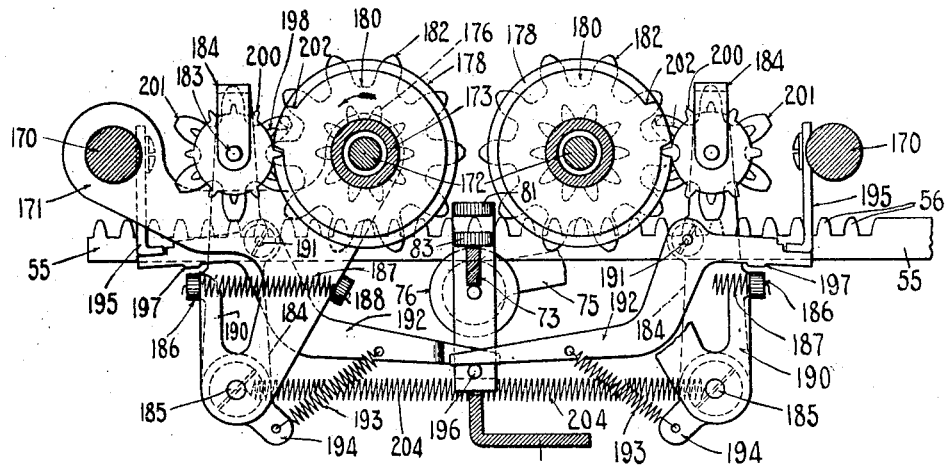
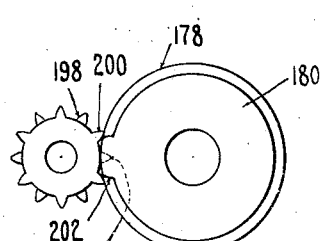
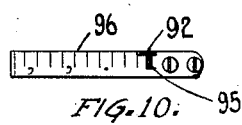
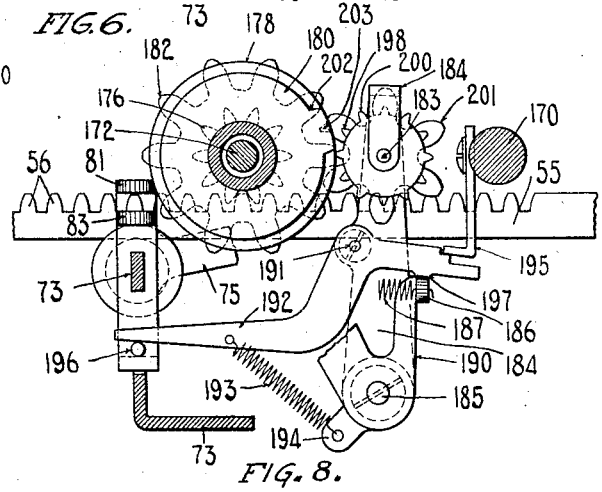
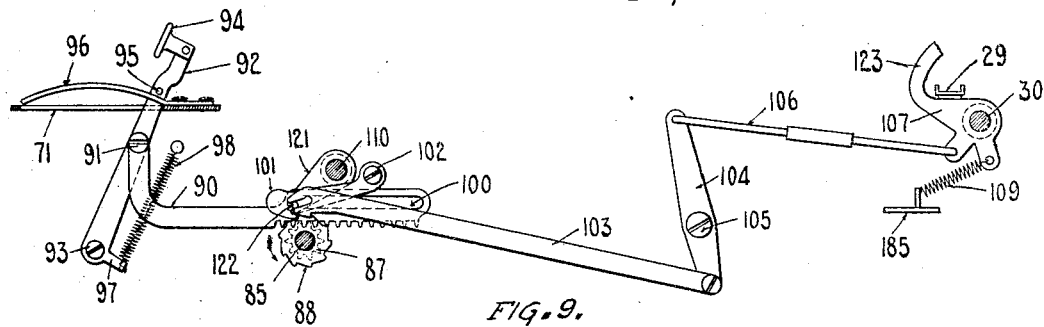
WITNESSES:
INVENTOR.
Glenn J. Barrett
BY Jacob Felbel
ATTORNEY.

G. J. BARRETT.
TYPE WRITING AND COMPUTING MACHINE.
APPLICATION FILED AUG. 18, 1911.
1,057,915.
Patented Apr. 1, 1913.
8 SHEETS—SHEET 5.
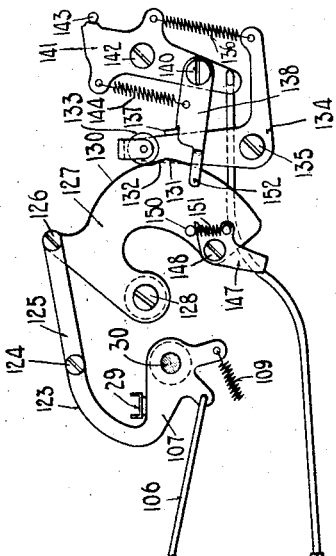
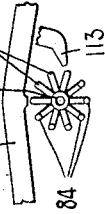
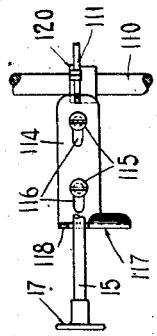
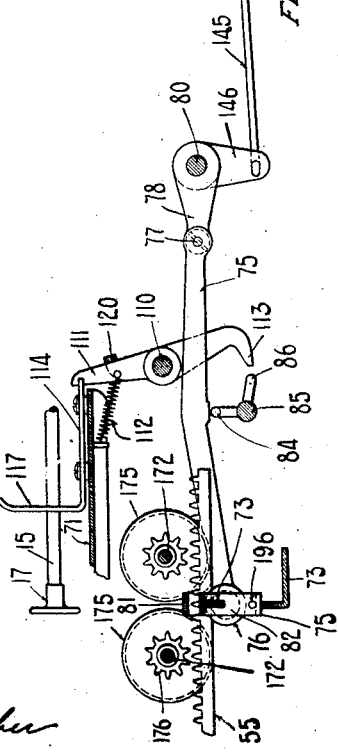
WITNESSES:
M. F. Hannwehr
R. H. Strother
INVENTOR.
Glenn J. Barrett
BY Jacob Felbel
ATTORNEY.

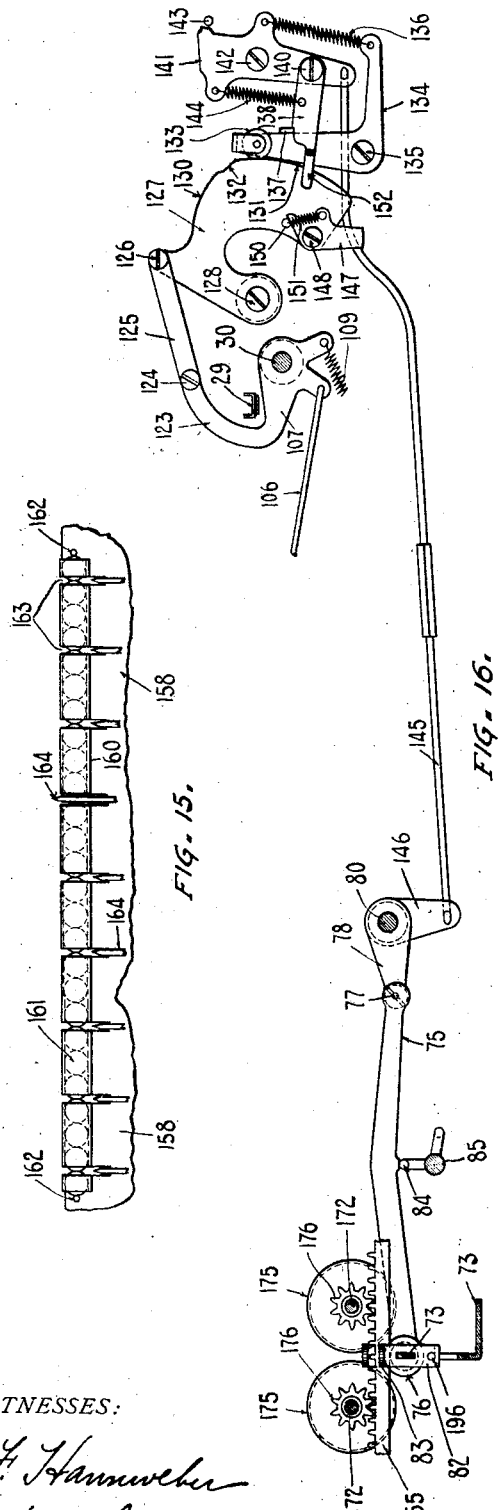

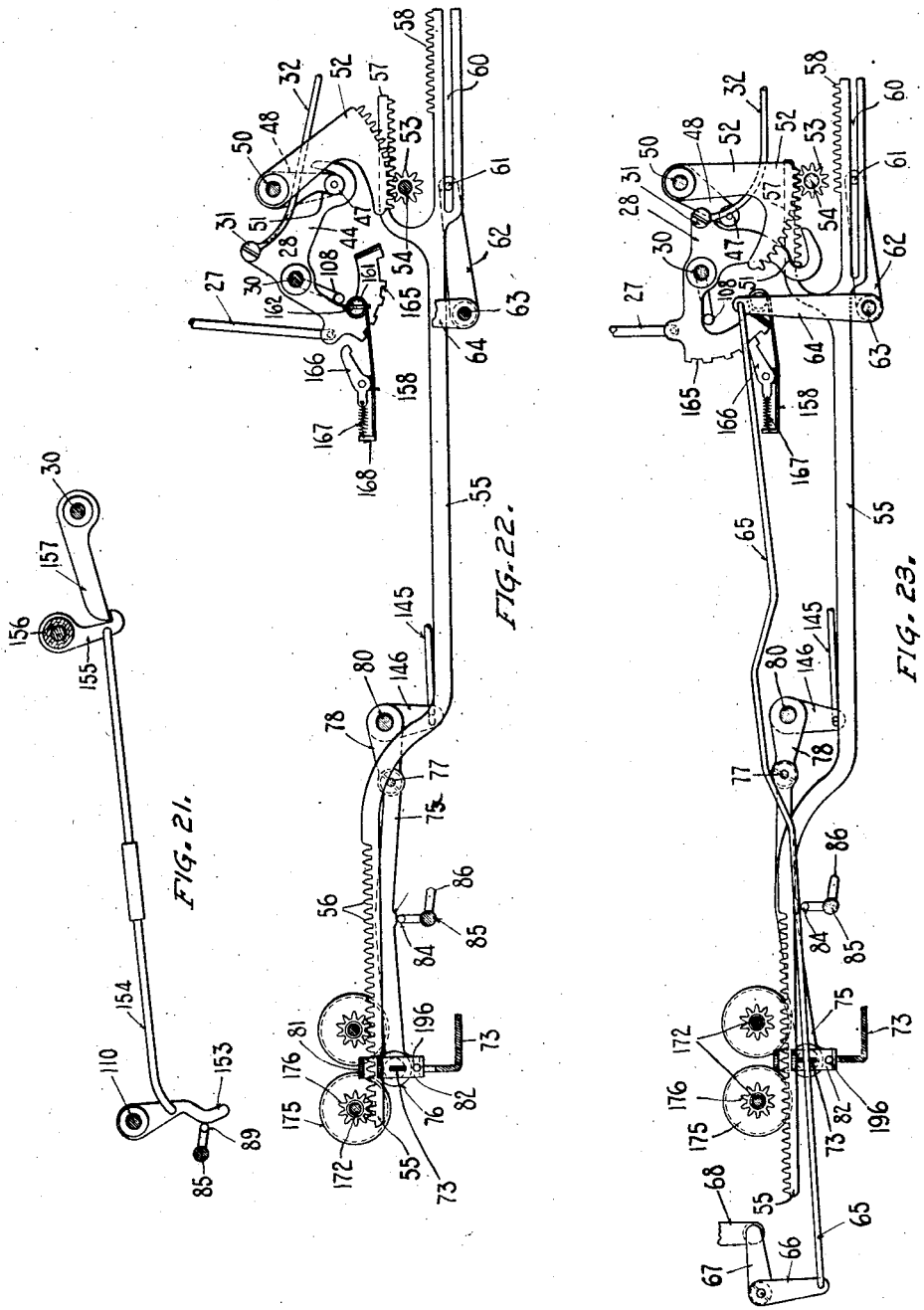

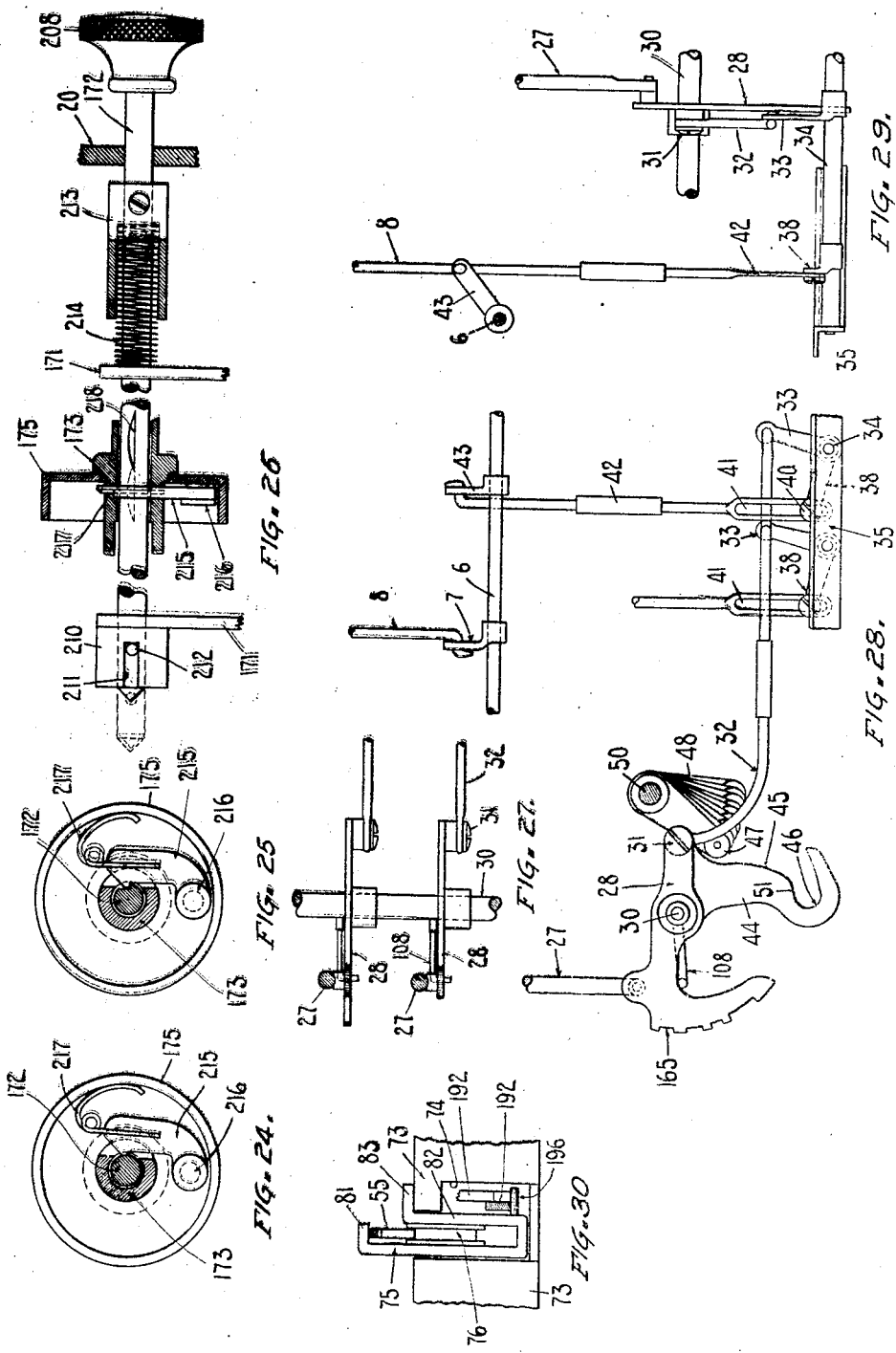

UNITED STATES PATENT OFFICE.

GLENN J. BARRETT, OF GRAND RAPIDS, MICHIGAN, ASSIGNOR TO THE SMITH PREMIER TYPEWRITER COMPANY, OF SYRACUSE, NEW YORK, A CORPORATION OF NEW YORK.

TYPE-WRITING AND COMPUTING MACHINE.

1,057,915.  Specification of Letters Patent.  Patented Apr. 1, 1913.

Application filed August 18, 1911. Serial No. 644,736.

*To all whom it may concern:*

Be it known that I, GLENN J. BARRETT, citizen of the United States, and resident of Grand Rapids, in the county of Kent and State of Michigan, have invented certain new and useful Improvements in Type-Writing and Computing Machines, of which the following is a specification.

My invention relates to computing machines and also to combined typewriting and computing machines.

The principal object of my invention is to provide an improved machine by which any words or numbers can be written and by which numbers written in connection with other typewritten matter can be subjected to computations, such as addition and subtraction.

I have provided computing mechanism in combination with the mechanism of a well-known typewriter, the two mechanisms being so combined that the typewriter can be used in the ordinary way and that a number can be written on the typewriter by a special set of numeral keys and added or subtracted by the computer, the computation or registration of the numbers taking place simultaneously with and being effected by the depression of said special numeral keys.

My invention also contemplates the use of a plurality of registers so arranged and so combined with the other mechanism that any particular number can be added or subtracted on any one of said registers or on more than one at the same time, if desired.

My invention includes numerous improvements both in computing mechanism itself and in the connections between the computing and typewriting mechanisms, all as will appear more fully hereinafter.

My invention consists in certain features of construction and combinations and arrangements of parts which will be fully set forth herein and particularly pointed out in the claims.

One form of my invention is illustrated in the accompanying drawings in which—

Figure 1 is a view in side elevation and partly in section and showing the general relative arrangement of the typewriting and computing machines and some of the connections. Fig. 2 is a side elevation with the upper part of the typewriter broken away, with the right-hand side plate of the computing machine removed, and with some parts in section. Fig. 3 is a top plan view on a greatly reduced scale of the keyboard of the typewriter and the part of the computer that projects out in front of the typewriter frame. Fig. 4 is an enlarged fragmentary top view, partly in section and showing the construction of the register wheels and some of the associated parts. Fig. 5 is a top plan view of the computing mechanism with the typewriter removed and with a few parts in section. Fig. 6 is a right-hand side elevation in section through the registers and with parts omitted and parts broken away. Fig. 7 is a detail side elevation of one of the register wheels and one of the transfer pinions. Fig. 8 is a view similar to part of Fig. 6 but showing the parts in the position they occupy when a key is depressed. Fig. 9 is a side view of part of the denomination selecting mechanism and some of its connections. Fig. 10 is a top view of a denomination indicator. Fig. 11 is a fragmentary top view of one of the denomination selecting keys of the computer and one of the tabulator keys of the typewriter and some of the connections. Fig. 12 is a side view of the same but showing also a part of the register and certain parts of the denomination selecting mechanism and of its connections with the keys. Fig. 13 is a top view of a certain shaft constituting part of the denomination selecting mechanism together with a fragmentary showing of some of the connections. Fig. 14 is a right-hand side view of the same. Fig. 15 is a fragmentary top view of the key arrester. Fig. 16 is a view similar to a portion of Fig. 12 but with the parts in the positions they occupy when a key is partially depressed. Fig. 17 is a view of a portion of the same but showing the parts at the end of a key depression. Figs. 18, 19 and 20 are side elevations of one of the key connections and showing the key arrester and full stroke device, the parts being in normal position in Fig. 18, at the end of the downstroke of the key in Fig. 20, and in the midst of the downstroke of the key in Fig. 19. Fig. 21 is a detail side view of a certain key locking device. Fig. 22 is a side view of parts of the register operating mechanism when a key is at the limit of its downstroke. In this view the mechanism is in the act of adding "9" on both registers. Fig. 23 is a view similar to Fig. 22 but showing the parts in normal position and showing also some additional parts not shown in Fig. 22. Figs. 24 and 25 are side views partly in section and on an enlarged scale and showing one of the register wheels and its zero-setting pawl. Fig. 26 is a view partly in section and illustrating the zero-setting devices. Fig. 27 is a fragmentary top plan view showing part of the connections to two of the numeral keys. Fig. 28 is a fragmentary side elevation of the same with some additional connected parts. Fig. 29 is a fragmentary front elevation of some of the connections shown in Fig. 28. Fig. 30 is a fragmentary front view, partly in section, and showing on an enlarged scale part of a certain guide plate and of the denomination selecting mechanism.

By a suitable modification of the connections my invention can be applied or adapted to various styles of typewriters. In the present case it is shown combined with a Smith Premier bottom strike typewriter. This machine has a main frame 1 and a carriage 2 on which is mounted a roller platen 3. The carriage is drawn across the machine by a spring drum in the usual way and its motion is controlled ordinarily by an escapement after the usual fashion of typewriting machines. This particular typewriter is a "full keyboard" machine, that is to say, it has a separate printing key 4 for each character to be printed; and each of said keys has its stem 5 connected with an arm projecting from a rock shaft 6 pivoted in the framework. There are a series of banks of these rock shafts extending from front to back of the machine and each of said shafts has an arm 7 to which is connected the lower end of a link 8 which at its upper end is connected with a type bar 9 carrying at its free end a type that is adapted to strike up against the under side of the platen 3. As shown in Fig. 3 there are in this machine eighty-four printing keys 4 and they include keys for printing capital and small letters, numerals and various other characters, so that the machine is adapted for writing any words and numbers. In this machine the numeral keys are arranged in two rows from back to front, one row at the extreme left of the keyboard and the other at the extreme right of the keyboard, the zero being printed with the same key as the capital "O". This typewriter is also equipped with a denominational tabulator. A column stop bar 10 is mounted on suitable arms at the back of the carriage 2 and one or more column stops 11 are adjustably mounted on said bar 10 so as to locate a column at any desired position on the page. Coöperating with the column stops 11 are a series of denominational stops 12, each consisting of the upper end of a long lever 13, said levers extending up and down behind the frame of the machine and being pivoted at 14 to said frame. The levers 13 are connected at their lower ends to a series of push rods 15 which extend forward beneath the frame of the typewriter and are guided at their forward ends in a bar 16. Each of the rods 15 has a tabulator key 17 mounted on its forward end, there being one of these keys 17 for each denominational position. By pushing one of said keys toward the rear of the machine against the tension of a suitable restoring spring, the corresponding lever 13 is rocked about its pivot, bringing the stop 12 into the path of the stops 11. A universal bar 18 operated by the levers 13, releases the carriage from its escapement and allows it to run free until one of the stops 11 strikes the operated one of the stops 12, when the typewriter carriage is positioned for writing the first digit of a number, the precise position of the carriage depending upon the denominational value of such first digit.

I have not thought it necessary to show nor to describe in minute detail the construction of this typewriter as it has been extensively marketed and is well-known in the art; and moreover, the exact construction of the typewriter is more or less immaterial to the present invention except insofar as some of the connections shown in the present case have been constructed with especial reference to this particular machine.

My computing mechanism is mounted in a frame 20 of substantially rectangular outline and is of substantially the same dimensions when seen in plan as the typewriter frame 1, except that the frame 20 projects somewhat in front of the typewriter frame. At the point marked 21 in Fig. 2, the typewriter frame is provided with sockets for the rubber feet on which such machines ordinarily rest. I have removed these rubber feet and provided on the computer frame short posts 22, shown in dotted lines in Fig. 5, which project into these sockets and properly connect the two machines, the typewriter frame resting on the computer frame. Also at the point marked 23 in Fig. 2 this particular typewriter has a vertical threaded hole which is designed for the reception of a screw to fasten the machine to a base board or desk. I have provided a screw 24 to be threaded into these holes, one on each side of the machine, to secure the typewriter frame to the computer frame. Said computer frame may be provided with rubber feet, if desired.

For writing and registering those numbers which are to be registered, I have provided at the back of the typewriter keyboard a special set of numeral keys 25. These keys have long stems 26 extending down into the computing machine and said stems are connected with restoring springs 27 (Fig. 2). Referring, for example, to Fig.

23, each of the key stems 27 is pivoted at its lower end to a plate 28 which is normally held by the spring 27 up against a stationary arresting bar 29 (Figs. 5 and 18). All of said plates 28 are loosely mounted on a transverse rock shaft 30. At the rear of said shaft each of said plates 28 has pivoted thereto at 31 a link 32 which extends horizontally toward the rear of the machine, its rear end being connected with an upright arm 33 on a transverse rock shaft 34. As best shown in Fig. 5, there are ten of these rock shafts 34 arranged in two sets at the right and left-hand sides of the machine and each pivoted at its outer end in a frame bar 35 and at its inner end in a frame bar 36, said bars 35 and 36 being connected to transverse bars 37, the whole constituting an auxiliary frame supported by lugs of the frame 20. In addition to the upright arms 33, each of the rock shafts 34 has a forwardly directed arm 38 into which is screwed a shouldered screw 40 (Fig. 28) that projects into a long slot 41 formed in the lower end of a vertical link 42, which at its upper end is pivoted to an arm 43 projecting from one of the rock shafts 6 of the typewriter. This chain of connections, of course, connects each of the numeral keys 25 with the rock shaft 6 that is operated by the regular typewriter numeral key of corresponding value. The construction is such that when the typewriter key is operated and the shaft 6 rocked thereby to operate the type bar, the link 42 moves down idly, the slot 41 sliding over the screw 40 without affecting the computer; but if one of the special numeral keys 25 be depressed, it both operates the computer and also the corresponding type bar in the typewriter.

In Fig. 28 there is shown the plate 28 that is connected to the zero key and which occupies the right-hand end of the system, and it will be seen that this plate is in the nature of a lever of the first order. The next plate to the left of it is that for the digit "9" and the other digits follow in regular order, the "1" key being at the extreme left. With the exception of that for the zero key each of the plates 28 has a downwardly extending arm 44 having its rear surface 45 constituting a cam, and said cam terminating in an open slot 46. These cams 45 are adapted to coöperate with a series of follower rollers 47 each mounted on an arm 48 and all of said arms are rigidly mounted on a rock shaft 50 which is pivoted at its ends in the side bars of the frame 20. As shown in Fig. 28 the arms 48 are set at different angles on the shaft 50, the one operated by the "9" key projecting the greatest distance toward the front of the machine, and the one operated by the "1" key the least distance to the front, the construction being such that the "9" key will rock the shaft 50 to about nine times the extent of the "1" key and the other keys will each rock the shaft to the appropriate extent. In the present construction the cams 45 are all alike and the variation is made in the setting of the arms 48. It will, of course, be understood that said arms can all be set alike if preferred and the cams 45 be varied. As will be apparent from Fig. 26, the last part of the cam surface 45 constitutes a dwell 51 so that the shaft 50 is stationary during the last part of the downstroke of the key and the first part of the upstroke. It will also be understood that the slot 46 prevents overthrow of the shaft 50. Any suitable spring may be provided for restoring said shaft to normal position.

As shown in Figs. 22 and 23 the shaft 50 has mounted thereon near its right-hand end a gear segment 52 which meshes with one of a series of pinions 53 on a transverse shaft 54 lying beneath the shaft 50 and journaled at its ends in the frame 20. It will be perceived that when any of the numeral keys 25 is depressed this shaft 54 will be turned to an extent appropriate to that particular key. The registers are operated by a series of bars 55, one for each denomination. Each of said bars at its forward end has rack teeth 56 to mesh with the register wheel and at its rear end each of said bars is forked, having an upper rack bar 57 that meshes with the upper side of a pinion 53 on the shaft 54 and the lower rack bar 58 is adapted to mesh with the under side of the same pinion. As will be understood by reference to Fig. 5 there is a series of these bars 55 distributed across the machine and each extending in front and back direction, and there is a corresponding series of pinions 53 distributed along the shaft 54. The parts are shown in normal position in Fig. 23 and in that figure the racks 57 are shown in mesh with the pinions 53 and the racks 58 out of mesh. It will be seen that the racks 57 extend from the shaft 54 toward the front of the machine whereas the racks 58 extend toward the rear. As will hereinafter appear, the registers are adapted to work equally well either way. In the present instance the numerals are arranged on the register wheels so as to effect addition when the racks 57 are in engagement as shown in Fig. 23, and subtraction when the racks 58 are in engagement. It will be apparent that under one of these conditions the bars 55 are moved toward the rear when a key is depressed and under the other condition they are moved toward the front. It will be seen that the racks at the front of the bars 55 are sufficiently long to actuate the registers when said racks are moved in either direction from normal position.

In order to shift the bars 55 up and down to change from addition to subtraction and vice versa, the means shown in Figs. 2 and 22 are provided. Each of said bars at its rear end is formed with a slot 60 into which a pin 61 projects from one of a series of arms 62 which are rigid on a rock shaft 63, which shaft is pivoted at its ends in the frame 20. There is one of the arms 62 for each bar 55. The rock shaft 63 has an upwardly extending arm 64 to which is pivoted the rear end of a long link 65 which at its forward end is pivoted to the depending arm 66 of a bell-crank which is pivoted to the frame 20 and which has also a horizontal arm 67 to which is pivoted the stem 68 of a subtraction key 70. The parts are held normally in the position shown in Fig. 3 where they are set for addition, this being effected by the weight of the bars 55 which, if desired, may be supplemented by a suitable spring. The key stem 68 passes through a slot in the top plate 71 (Fig. 2) which covers up the forwardly projecting part of the computer; and said key stem is formed with a hook or projection 72, which, when the key 70 is depressed, can be pushed back under the plate 71 and thus hold said key depressed and hold the parts in position for subtraction. When it is desired to change back to addition the key 70 is pulled toward the front of the machine to release it.

From the foregoing description it will be seen that whenever one of the computer keys 25 is depressed, all of the bars 55 are moved longitudinally in unison and to an extent depending upon the value of the operated key. The bars 55 at their forward ends are normally in a depressed position as shown in Fig. 23 and they are elevated one at a time to bring them successively into position to operate the register or registers as shown in Fig. 22, by denomination determining and selecting mechanism which will now be described.

Referring to Figs. 12 and 30, 73 is an angled stationary plate fixed in the frame 20, below the registers and below the forward ends of the bars 55. A vertical flange of this plate is formed with a series of cut-outs 74 of the form shown in Fig. 30, there being one of these cut-outs for each of the bars 55. Said cut-out includes a vertical slot which acts as a guide for the forward end of a horizontal lever 75, which at its forward end carries a grooved guide roller 76 for the bar 55 and which at its rear end is pivoted at 77 to an arm 78 rigidly mounted on and projecting horizontally from a rock shaft 80 which is pivoted at its ends in the frame 20. It will be understood that there is one of these arms 78 and levers 75 for each denomination. At its forward end each lever 75 has an ear 81 bent off therefrom over the top of the bar 55 to retain said bar in position on the roller 76. Said lever is also bent into a U-shape, as seen from the front in Fig. 30, making a branch 82 between which and the main body of the lever the roller 76 is mounted. Said branch 82 has an ear 83 bent off therefrom and adapted to rest on the top of the guide bar 73. The rollers 76 are elevated one at a time by rocking the shaft 80 toward the front of the machine, thus depressing all of the pivot points 77 and by interposing temporary fulcrums under the middles of the levers, one after another. If an abutment or fulcrum be interposed under the middle of one of the levers 75 and the shaft 80 be rocked, the motion of that particular lever will be modified. The forward end of that lever will be elevated and all of the other levers will merely drop down at their rear ends without being elevated at their forward ends. These temporary fulcra consist of pins 84 projecting in a spiral series from a rock shaft 85 which is journaled at its ends in the frame 20. A detached top view of this shaft is shown in Fig. 13 where it will be seen that said shaft is provided not only with the spirally arranged pins 84 but also with another set of spirally arranged pins 86. Each of these pins consists of a wire rigidly mounted in the shaft and bent off at its upper end parallel with the shaft. The two sets of pins can be distinguished by the fact that the pins 84 happen to be bent off toward the right and the pins 86 toward the left. The pins 86 are used for setting the shaft 85 as will presently appear. This shaft is also provided near its right-hand end with a pin 89 which operates a key lock that will be described later on. In Fig. 12 and in some of the other figures, in order to avoid confusion, I have shown only one of the pins 84 and the corresponding one of the pins 86.

The means for operating the shaft 85 to bring the desired or selected pin 84 into operative position, can be understood by reference to Figs. 9 to 14 inclusive. Near its left-hand end said shaft has fixed thereon a pinion 87 and a ratchet wheel 88. Said pinion is constantly engaged by rack teeth formed on the under side of a bar 90 which at its forward end is pivoted at 91 to a lever 92 pivoted at 93 to a lug projecting from the frame 20 (Fig. 5). The lever 92 projects upward through a suitable slot in the cover plate 71 and it has a key 94 mounted thereon. Above said plate 71 the lever 92 has an index pin 95 projecting therefrom and adapted to coöperate with a scale plate 96, (Fig. 10) screwed to the plate 71 and marked to indicate denominational positions. The operator can tell at all times by reference to this index and scale in what denomination the mechanism is set to operate. The lever 92 has at its lower end an arm 97 which is controlled by a spring 98, the tension of said spring being exerted always to turn the shaft 85 in the direction of the arrow in Fig. 9 and to move the lever 92 toward the front of the machine. At its rear part the rack bar 90 is formed with a long slot 100 through which passes a pin projecting from the stationary framework to hold the rack bar in engagement with the pinion 87. The motion of the parts under the impulse of the spring 98 is normally prevented by a pawl 101 which is pivoted to the framework at 102, said pawl engaging the ratchet wheel 88. The shaft 85 can be turned in a direction the opposite of that of the arrow in Fig. 9 and against the tension of the spring 98 by pushing back the key 94. In the operation of the machine said shaft is turned step-by-step by means of a pawl 103 which engages the ratchet wheel 88 and which at its rear end is pivoted to the lower end of a lever 104 of the first order, which lever is pivoted at 105 to the frame 20. At its upper end the lever 104 is connected by a link 106 with an arm of a plate 107 which is rigidly mounted on the shaft 30. It will be recalled that this is the shaft on which are pivoted the plates or levers 28 which are directly operated by the special computing and writing keys 26. The shaft 30 is rocked toward the front of the machine whenever one of said keys is depressed. To this end said shaft has a series of pins 108 (Fig. 22) projecting therefrom, one such pin by the side of each of the plates 28, and each of said pins is bent off in such a manner as to be moved by said plate 28 whenever the latter is operated. The shaft is restored to normal position by means of a spring 109 connected at one end with an arm of the plate 107 (Fig. 9) and at its other end to a fixed part of the machine. The motion of the shaft under the impulse of the spring 109 is arrested by a part of the plate 107 coming in contact with the stop bar 29. The construction is such that whenever one of the keys 25 is depressed, the pawl 103 moves forward to take hold of a new tooth of the wheel 88 and on the up-stroke of the key said pawl operates said wheel and turns the shaft 85 to bring the next succeeding pin 84 into its operative position shown, for example, in Fig. 12.

It will be seen that the effect of the operations just above described will be that when the last digit of a number is written, the shaft 85 will have been rocked as far as it will go on account of the limitation of the movement of the rack bar 90. Said shaft is set for the highest digit of the new number to be written by the spring 98 acting under the control of certain finger keys. Means are provided whereby the shaft 85 can be set under control of the denominational tabulator keys 17 of the typewriter so that the computing mechanism will be set in harmony with the setting of the typewriter carriage. Means are also provided whereby said shaft 85 can be set independently of the typewriter carriage. A transverse rock shaft 110 is mounted above and a little back of the shaft 85, and a series of levers 111 of the first order are pivoted on said shaft 110 so that any one of said levers can be rocked independently of the others. Each of said levers is normally held in the position shown in Fig. 12 by means of a restoring spring 112. Each lever 111 has at its lower end a forwardly projecting toe 113 which is adapted when the lever is rocked to be moved into the path of one of the setting pins 86 which project from the shaft 85. The levers 111 are operated by slides or plates 114 (Figs. 11 and 12) mounted on top of the plate 71 by screws 115 passing through slots 116 in the slides 114. Each of said slides has at its rear end a notch that engages the lever 111 and each of them at its forward end is bent up to form a push key 117 which can be operated directly by the finger. The upturned forward end of the plate 114 also includes a branch 118, leaving a slot or notch between said branch and the key 117 through which slot or notch the push rod 15 of one of the typewriter tabulator keys 17 passes. The construction is such that when one of said tabulator keys is pushed to the rear to position the typewriter carriage, it, in the latter part of its stroke, operates the plate 114 and sets the shaft 85 in harmony with the setting of the typewriter carriage. The construction is also such that the two sets of keys are connected and disconnected by the mere act of setting the typewriter on the computer frame and removing said typewriter from said frame.

The shaft 110 is arranged to be rocked by any one of the levers 111 and when so rocked releases the ratchet wheel 88 from its retaining pawl 101 and its operating pawl 103. To this end said shaft has a series of arms 120 extending therefrom, one of such arms by the side of each of the levers 111 and each arm 120 bent off at its upper end to form an ear standing behind the lever 111. These arms cause the shaft 110 to rock in unison with the operated one of the levers. Near its left-hand end the shaft 110 has an arm 121 projecting therefrom downward and forward (Figs. 5 and 9) and said arm has a pin 122 projecting therefrom through slots in the pawls 101 and 103. The construction is such that when the shaft 110 is rocked by one of the levers 111, these pawls are lifted out of the ratchet wheel 88, leaving the shaft 85 free to be turned by the spring 98 until arrested by one of the pins 86 striking the toe 113 of the operated lever 111. When the key 17 or 117 is released, the shaft is restored to the control of the pawls. In setting said shaft in the manner described, the lever 92 will of course move toward the front of the machine and it will be fed backward step by step by the pawl 103 as the keys are operated. Meanwhile the typewriter carriage is also being fed forward by its escapement so that each number written on the typewriter is added or subtracted in the corresponding denomination in the computer.

The means for operating the shaft 80 at each key stroke, are best shown in Figs. 12, 16 and 17. Said shaft 80 is operated by an indirect connection with the shaft 30 of such character as to rock said shaft in the first part of the down stroke of a key 25, thus moving one of the rack bars 55 to operative position and holding said rack bar in operative position until the down stroke of the key is completed. Early in the up-stroke of the key the connection between the shafts 30 and 80 is snapped off so as to drop the operative one of the bars 55 down to inoperative position before said bar begins to move longitudinally to normal position. The plate 107 has a branch or arm 123, the upper end 124 of which normally stands above the shaft 30, as shown in Fig. 12. At 124 said arm has pivoted thereto a link 125, the rear end of which is pivoted at 126 to a cam plate 127 which is pivoted at 128 to the frame 20. The cam plate 127 has its rear edge comprising two concentric parts or dwells 130 and 131, the latter of greater radius than the former and said dwells connected by an incline 132. This cam edge operates on a follower roller 133 which (Fig. 12) normally rests against the dwell 130 and in position to be moved toward the rear by the incline 132 in the first part of the down stroke of a key 25. The roller 133 is mounted in the vertical arm of a bell crank 134 which is pivoted at 135 to the frame 20, the horizontal arm of said bell crank being connected with a restoring spring 136. The vertical arm of said bell crank has an ear 137 bent off therefrom and normally engaging a notch in a pawl or latch 138 which is pivoted at 140 to a lever 141, said lever being pivoted to the frame 20 at 142. The restoring spring 136 is also connected with this lever 141 and normally holds it against a stationary stop pin 143, the tension of said spring being exerted to move the latch 138 toward the front of the machine. Said latch is pressed up against the ear 137 by means of a spring 144 connected at one end to the latch and at the other end to the lever 141. The lower end of said lever 141 is connected by a link 145 with an arm 146 depending from the rock shaft 80. The construction is such that when the shaft 30 is rocked by the depression of a key the cam plate 127 moves the bell crank 134 and said bell crank, acting through its ear 137 and the latch 138, rocks the lever 141, and said lever through the link 145 rocks the shaft 80 and depresses the rear ends of all the levers 75. The dwell 131 holds the parts in their operated position during the remainder of the down stroke of the key.

The cam plate 127 has a dog 147 pivoted thereto on a screw 148 and drawn back against a stop pin 150 by means of a spring 151. The latch 138 has a finger 152 projecting therefrom into the path of the dog 147. In the last part of the down stroke of the key, this dog snaps past the finger 152, being free to turn for that purpose against the tension of its spring 151. This position of the parts is shown in Fig. 17. In the first part of the return stroke of the key said dog depresses the finger 152, moving the notch of latch 138 out of engagement with the ear 137 and allowing the lever 141 to be swung by its spring 136 to move the link 145 toward the front of the machine and to restore the shaft 80 and the levers 75 to their normal positions. It will be recalled that the last part of each of the cams 45 consists of a dwell so that the rack bars 55 do not begin their longitudinal motion toward normal position until after the latch 138 has been tripped off. When the parts resume their normal positions shown in Fig. 12 the latch 138 snaps back into engagement with the ear 137 ready for another operation.

In order to render the denomination selecting mechanism inoperative and thereby to render inoperative the entire computing mechanism, the scale plate 96 has near the rear end thereof a notch of such sort that the lever 92 can be forced slightly to the right and into said notch and that is the position of said lever shown in Fig. 10. When the lever 92 is in this locking notch the rack bar 90 and the shaft 85 are locked against motion and the shaft 85 will remain in its normal position even though one of the tabulator keys 17, or one of the finger keys 117, be operated. The tabulator of the typewriter can then be used without affecting the computing mechanism. When the parts stand in the position shown in Figs. 9 and 10, none of the pins 84 is in operative position.

In order to lock the special keys 25 when the shaft 85 and connected parts stand as shown in Fig. 9, a key lock is provided which will be understood by reference to Fig. 21. On some convenient part of the machine, in the present instance on the shaft 110 near the right-hand end thereof, a lever 153 is pivoted, said lever hanging down behind the shaft 85. Said lever is connected by a link 154 with a hook 155 which is pivoted to a stationary part, shown in Fig. 5 as consisting of a lug 156 projecting from the frame 20. The lever 153 stands in the plane of rotation of the pin 89 hereinbefore referred to as mounted on the shaft 85, and the hook 155 stands in the plane of an arm 157 projecting from and fixed to the shaft 30. When the shaft 85 stands in the position shown in Fig. 9, the pin 89 stands in the position shown in Fig. 21 where it forces the lever 153 toward the rear, thus moving the hook 155 under the arm 157 and locking the shaft 30 against oscillation and therefore locking the keys 25 against depression. The shaft 85 is turned during the up-stroke of any key 25, and said shaft assumes the position referred to, after the operation of the register wheel of lowest order. The locking of the keys at this time will prevent the operator from making the mistake of operating another key before resetting the denomination selecting mechanism. The pin 89 also stands in the position shown in Fig. 21, when the lever 92 stands in the extreme forward end of the slot in the plate 71. In other words, the motion of this lever from one end of the slot to the other imparts just about one complete rotation to the shaft 85. It is important that the keys be locked when the lever 92 stands in its extreme forward position because this is one step farther forward than it is intended this lever stand at any time, but the parts could escape to that position by an improper operation of the keys 117. If, for example, the key 117 for the thousands position be first operated and afterward the key for the tens position be operated, the pin 86 which should arrest the shaft 85 in the tens position will already have passed the toe 113 of the corresponding lever 111. The result will be that the shaft will be released but it will not be arrested by said pin and toe and it will escape to its extreme operated position. The locking device which has been described prevents an improper operation of the mechanism under these conditions in case the operator should fail to observe the mistake. In case the lever 92 gets either to this extreme forward position or to any other position that is farther forward than it is desired to have it, it can be pushed back to the desired position by operating the key 94. In this case the pawls 101 and 103 will snap over the teeth of the ratchet wheel 88 and will retain the shaft in its set position.

The keys 25 are under the control of a key arrester, shown in Figs. 15, 18, 19 and 20, for preventing two keys from being depressed at once, and for preventing one key from being depressed until the previously operated key has been restored to normal position. A plate or bar 158 is mounted at its ends in lugs projecting from the frame 20, said plate lying below and in front of the shaft 30. The plate 158 has its rear edge rolled back to form a tubular part 160 which contains a set of balls 161 which are held in said tubular part by pins 162, one at each end of the series of balls. Slots 163 are cut in the plate 158 and each of the levers 28 has a segmental part 164 with a beveled end 165 that is adapted to play in said slots 163 between the balls 161. The parts are so proportioned that when one of the arms 164 lies between two of the balls 161 the pins 162 will prevent any other pair of balls from separating to a sufficient extent to allow of the depression of another key. Each of the plates 28 is also controlled by a full-stroke device. To this end each of the segments 164 has a series of notches cut in its forward edge and a full stroke pawl 166 pivoted to the plate or bar 158 cooperates with these notches or with the teeth between the notches. The pawls 166 are controlled by springs 167 connected to a flange 168 bent up from the bar 158. Said springs tend to bring the pawls each to a middle position as shown in Fig. 18, in which figure the parts are in normal position. When one of the keys 25 begins to move downward, the pawl 166 begins to snap over the teeth as shown in Fig. 19 and thus prevents the return of the key to normal position until it has reached the bottom of its stroke as shown in Fig. 20. At this time the pawl 166 has escaped from the notches 165 and said pawl is reversed on the up-stroke of the key, acting to prevent a second depression of the key until said key has completed its up-stroke. This device insures the completion of both the registering and the printing operations.

I contemplate if desired the use of a plurality of registers which can be operated either singly or more than one at a time. Two registers are shown in the present instance but others can be added, necessitating, however, the lengthening of the rack bars 55. The two registers shown are identical in construction except that the parts of one are arranged in a reverse manner compared with the parts of the other in this respect, namely, that the wheels of the forward register are back of the other parts of said register, whereas the wheels of the rear register are in front of the corresponding parts of said rear register. This arrangement is not necessary, but it is convenient where only two registers are employed because it gets the register wheels a little closer together and therefore does not require quite as long a rack bar 55.

I will describe the forward one of two registers and this will enable the construction of the rear register to be understood with little or no additional description. A rock shaft 170 (Fig. 6) is mounted at its ends in the forward extension of the frame 20 and said rock shaft has mounted thereon a series of plates 171, said plates supporting the mechanism of the register. A shaft 172, lying directly in rear of the shaft 170, is journaled in the several plates 171 and said shaft 172 has register wheels mounted on it, there being one register wheel between each two consecutive plates 171. The construction of these register wheels can be best understood by reference to Fig. 4 when viewed in connection with some of the other figures in the drawing. Each of said wheels comprises a long hub 173 which is turned to different diameters in different parts of its length, as shown in section in Fig. 4, thus forming certain shoulders on which the various parts of the wheel are assembled, as will be understood. The sleeve 173 at its extreme right-hand end has a bearing on the shaft 172 and the remainder of said sleeve or hub is preferably bored out to a diameter greater than that of the shaft, and in the extreme left-hand end of this bore a short, headed collar 174 is inserted, this collar constituting the left-hand bearing end of the sleeve and the head of the collar serving to retain certain of the parts in position on the sleeve. 175 represents the drum on which the numerals are printed. 176 is the pinion that is adapted to be engaged by the rack bar 55. 178 and 180 are two disks constituting elements of the transfer mechanism, which transfer mechanism as shown in the present instance is one variety of Geneva stop motion. The two disks 178 and 180 are separated by a washer 181. 182 is another gear wheel constituting an element of another transfer, namely, that between the particular wheel under consideration and the next one of lower order. In Fig. 6 the section is taken just to the left of one of the drums 175 and this figure shows the disks 180 and 178 of the wheel through which the section is taken and the gear 182 and pinion 176 of the next wheel to the left. The connecting elements of the Geneva stop motion are journaled on a pin or short shaft 183 which is mounted in a lever 184 pivoted at its lower end on a screw 185 threaded into the lower part of the partition plate 171, this lever being movable so that the Geneva wheel can be moved out of engagement with the two register wheels. The lever 184 has an ear 186 bent off therefrom and a spring 187 connects said ear with another ear 188 bent off from the partition plate 171, the tension of this spring being exerted to hold the elements of the Geneva motion in gear. The motion of the parts under the impulse of said spring is limited by an arm 190 of the partition plate 171, said arm being so formed that it can be adjusted by bending it. The lever 184 has pivoted thereto at 191 a locking lever 192, which lever is controlled by a spring 193 connected thereto at one end and at its other end connected to an arm 194 of the lever 184. Each of the levers 192 has a forwardly extending arm, the forward end of which is stepped as shown in Fig. 6 and the lowest step of said arm normally coöperates with a small bracket 195 which is secured to the shaft 170 and depends in the position shown. This bracket 195, coöperating with the stepped-in lever 192, positively locks the lever 184 against rocking and positively holds the two parts of the Geneva motion in engagement. Any one of these locks, however, can be released by elevating the rearwardly extending arm of the lever 192. Said rearward arm lies over a pin 196 projecting from the side of the U-shaped end of one of the levers 75, as shown in Figs. 6 and 30. The construction is such that when said lever 75 is operated to raise the rack bar 55 into engagement with the pinion 176 the lever 192 is also rocked and released from the bracket 195. The forward arm of said lever has a lug 197 thereon which, when the lever is rocked, comes in contact with the ear 186 of the lever 184. As soon as these parts touch, the lever 184 is compelled to rock with the lever 192 and it is thus forced forward, moving the Geneva wheel away from the register wheels. Preferably the lever 184 is bent horizontally at its top, said horizontal portion extending across the partition plate 171, being bent down at its right-hand end to form a right-hand bearing for the pin or axle 183. The Geneva wheel is thus journaled between the two branches of an inverted U-shaped support.

198 and 200 are star wheels meshing respectively with the disks 178 and 180 and at 201 there is a pinion meshing with the gear 182 of the next higher denomination. The disk 178 and the star wheel 198 coöperates to lock the Geneva wheel except when passing from nine to zero or from zero to nine. The parts are shown in the midst of this operation in Fig. 7. In said figure it will be seen that the disk 180 has one tooth 202 which is a starting tooth coöperating with the teeth of the star wheel 200 to start the Geneva wheel. Even with the middle of the tooth 202, the disk 178 is formed with a notch 203 into which one of the teeth of the star wheel 198 passes when said star wheel is started by the tooth 202 coöperating with the wheel 200. This notch 203 acting on one of the teeth on the wheel 198 completes the motion of the Geneva wheel which motion is, of course, communicated to the next register wheel of higher order. By reference to Fig. 6 is will be seen that there is a little lost motion between the tooth 202 and the first tooth of the star wheel 200. The Geneva motion is so designed as to impart to the wheel of higher order one tenth of a turn by a motion of about one twelfth of a turn on the part of the wheel of lower order. This difference is enough to take up any lost motion in the train of gearing so that in the case of transfer along a row of nines the transfer will take place promptly throughout the series.

The rear register has its levers 192 lying on the same pins 196 as the corresponding levers of the forward register as shown in Figs. 5 and 30. Each register frame is pivoted by reason of the fact that the shaft 170 is pivoted at its ends in the frame 20. The two registers are normally held up in inoperative position by means of a spring 204 (Fig. 6) which connects the lower parts of the two frames near one end. The registers normally stand so high that the pinions 176 will not be engaged by the rack bars 55 even when the latter are elevated in a manner which has been described. In order to depress either register frame or both to operative position each of said register frames is provided with a key 205, the stem of which passes through a suitable slot in the top plate 71 or in an escutcheon 206 (Fig. 3) mounted on top of said plate 71, the lower end of the key stem being pivoted to the register frame. In the present instance each of said key stems is pivoted to the shaft 172. Each of said key stems is formed with a notch 207 so disposed that when the key is depressed it can be pushed to the front or back so as to cause this notch to engage under the plate 206 and hold the key in its depressed position. It will be seen that either register can be moved down to operative position or that both can be so moved. It will also be perceived that other registers can be mounted in the machine in a similar fashion and operated by the same rack bars 55.

In order to set the registers to zero each of them is provided with a milled head 208 mounted on the end of the shaft 172, which shaft projects through a slot in the side of the casing for this purpose. As shown in Figs. 24, 25 and 26, the shaft 172 at its left-hand end passes through a hub or collar 210 rigidly mounted on the extreme left-hand one of the plates 171. Said collar has an open longitudinal slot 211 into which a pin 212 projects from the shaft 172. At the right of the register frame said shaft has rigidly mounted thereon a collar 213 counterbored, as shown in Fig. 26 for the reception of a spring 214 which is coiled about the shaft and compressed between the bottom of the counterbore and the right-hand plate 171. This spring holds the shaft in its right-hand position with the pin 212 seated in the bottom of the slot 211; and said shaft can be pushed to the left until said pin is out of said slot, when the shaft can be given a complete turn to bring the register wheels to zero. Each of said register wheels has mounted in the drum 175 thereof a pawl 215 which is pivoted to said drum at 216 and which at its free end lies in a transverse slot cut in the hub 173 so that the free end of the pawl can engage the shaft 172 toward which it is pressed by a spring 217. Said shaft has a series of notches 218 cut therein and each normally standing a little to the right of one of the pawls 215, as shown in full lines in Fig. 26. When said shaft is pushed to the left these notches go into position to engage the pawls, as shown in dotted lines in Fig. 26, and when the shaft is turned the register wheels are picked up and carried to zero. These wheels are normally locked against rotation by the transfer mechanism In order to unlock them for the purpose of setting them to zero, the key 205 is capable of being forcibly depressed to move the register frame down farther than its operative position. The effect of this extra downward motion is to cause the levers 192, by reason of their contact with the pins 196, to be rocked about their pivots to a sufficient extent to unlock the register wheels. These levers automatically return to locking position when the pressure on the key is released.

Some of the features of the machine described herein are shown in somewhat different forms in prior applications of mine, and said prior applications contain claims that read on the present construction.

It will of course be understood that various changes can be made in the details of construction and arrangement without departing from my invention, that parts of the invention can be used without other parts, and that some of the features of the invention can be used in machines differing considerably in other respects from the specific machine here shown and described.

What I claim as new and desire to secure by Letters Patent, is:—

1. In a computing machine, the combination of a series of denominational devices, a group of numeral keys common to said devices, denomination selecting mechanism including a part that moves step-by-step as said keys are operated, means for setting said denomination selecting mechanism for the first denomination of a number to be registered, and means for locking said numeral keys except when said denomination selecting mechanism is set to correspond to some denomination.

2. In a combined typewriting and computing machine, the combination of a typewriter carriage, computing mechanism including denomination selecting mechanism, said denomination selecting mechanism including a part movable step by step independent of the typewriter carriage, denominational tabulator mechanism for positioning said carriage, a spring for operating said step by step moving part, stops controlled by said tabulator keys for arresting said part in harmony with the position of the typewriter carriage, keys for operating said computing mechanism, and means for locking said keys in case said step by step moving part escapes from said stops.

3. In a combined typewriting and computing machine, the combination of a typewriter carriage, computing mechanism including denomination selecting mechanism, said denomination selecting mechanism including a part movable step by step independently of the typewriter carriage, denominational tabulator mechanism for positioning said carriage, a spring for operating said step by step moving part, stops controlled by said tabulator keys for arresting said part in harmony with the position of the typewriter carriage, keys for operating said computing mechanism, means for locking said keys in case said step by step moving part escapes from said stops, and hand operating means for moving said part back to set position in case such part escapes from said stops.

4. In a combined typewriting and computing machine, the combination of a typewriter carriage, denomination selecting mechanism for the computing machine operating independently of said typewriter carriage, denominational tabulator mechanism for positioning said typewriter carriage and said denomination selecting mechanism in unison, and means for locking said denomination selecting mechanism so that said tabulator mechanism can be used to position the typewriter carriage without affecting the computing mechanism.

5. In a combined typewriting and computing machine, the combination of a typewriter carriage movable step by step, denomination selecting mechanism for the computing mechanism including a part movable step by step independently of the typewriter carriage, a spring for operating said part, means for holding said part against the tension of said spring, denominational tabulator keys, means whereby said keys when operated position the typewriter carriage, means whereby any of said keys releases said holding means, stops operated by said keys for arresting said part in different denominational positions as desired, and means for locking said part so that said tabulator keys do not position said denomination selecting mechanism.

6. In a combined typewriting and computing machine, the combination of a typewriter carriage, denomination selecting mechanism for the computing mechanism, means for moving said carriage step by step, independent means for moving a part of said denomination selecting mechanism step by step, tabulator mechanism for positioning said typewriter carriage, connections from said tabulator mechanism to said step by step moving part for positioning said part in harmony with the typewriter carriage, and means for preventing said part from being positioned by said tabulator mechanism so that the tabulator mechanism can be used to position the typewriter carriage without affecting the computing mechanism.

7. In a combined typewriting and computing machine, the combination of a carriage in the typewriter, a denominational tabulator for said carriage, denomination selecting mechanism in the computer and including a device that moves step by step independently of said typewriter carriage, means controlled by the typewriter tabulator for setting said step by step moving device, and means for setting said device independently to any desired denominational position.

8. In a combined typewriting and computing machine, the combination of a carriage in the typewriter, a denominational tabulator for said carriage, denomination selecting mechanism in the computer and including a device that moves step by step independently of said typewriter carriage, said denominational tabulator having a series of keys, a series of keys for setting said step by step moving device, and means whereby the keys of one set operate those of the other set.

9. In a combined typewriting and computing machine, the combination of a typewriter frame, a computer frame, means for connecting the two frames, a tabulator in the typewriter, denomination selecting mechanism in the computer, hand operated means for setting said denomination selecting mechanism, and means for connecting said hand operated means and said tabulator when the two frames are connected.

10. In a combined typewriting and computing machine, the combination of typewriting mechanism including a traveling carriage, tabulator mechanism for arresting said carriage at different denominational positions as desired, computing mechanism including a shaft having spirally arranged denominational determining devices thereon, a spring for rotating said shaft, and means controlled by the tabulator mechanism of the typewriter for arresting said shaft in different positions corresponding to the different positions of arrest of the typewriter carriage.

11. In a combined typewriting and computing machine, the combination of a typewriter carriage movable step by step, tabulator keys and connections for arresting said carriage in different denominational positions as desired, computing mechanism having a shaft, denomination determining devices arranged spirally on said shaft, a spring for rotating said shaft independently of the typewriter carriage, means for moving said shaft step by step, and means controlled by said tabulator keys for setting said shaft to different denominational positions corresponding to the different denominational positions to which the typewriter carriage is set.

12. In a combined typewriting and computing machine, the combination of a typewriter carriage movable step by step, tabulator keys and connections for setting said carriage to different denominational positions as desired, computing mechanism comprising denomination selecting mechanism, and said denomination selecting mechanism including a shaft, stops arranged spirally on said shaft, and coöperating stops controlled by said tabulator keys.

13. In a combined typewriting and computing machine, the combination of a typewriter carriage movable step by step, tabulator keys and connections for setting said carriage to different denominational positions as desired, computing mechanism comprising denomination selecting mechanism, and said denomination selecting mechanism including a shaft, stops arranged spirally on said shaft, coöperating stops controlled by said tabulator keys, and special keys for controlling said coöperating stops to set said shaft independently of the typewriter carriage.

14. In a computing machine, the combination of a register, means for actuating said register one denomination at a time, denomination selecting mechanism comprising a shaft, a spring for turning said shaft in one direction, stops spirally arranged on said shaft, means for arresting said shaft by any desired one of said stops in order to set said denomination selecting mechanism at any desired denominational position, and means for turning said shaft step-by-step against the tension of its spring at each operation of the register.

15. In a computing machine, the combination of a register, a single group of keys common to all denominations, denomination selecting mechanism including a shaft, a spring for turning said shaft in one direction, means for setting said shaft at any desired denominational position, and pawl and ratchet mechanism operated by said keys for turning said shaft step by step against the tension of said spring.

16. In a combined typewriting and computing machine, the combination of a typewriter carriage, a set of numeral keys adapted to write on the typewriter and to actuate the computing mechanism, tabulator keys and connections for setting said carriage to different denominational positions as desired, denomination selecting mechanism in the computing mechanism, said denomination selecting mechanism including a part settable to different denominational positions, a spring for moving said part in one direction, means for holding said part in different positions, means operated by said tabulator keys for releasing said part and arresting it in different denominational positions, and means operated by said printing and computing keys for moving said part step by step independently of said typewriter carriage and against the tension of said spring.

17. In a computing machine, the combination of a register, a single group of numeral keys common to all denominations, denomination selecting mechanism including a part movable step by step from one denominational position to another, a spring for moving said part in one direction, a pawl for holding said part against the tension of said spring, a second pawl operated by said numeral keys for moving said part step by step against the tension of said spring, denomination selecting keys, means operated by any of said keys for releasing said pawls, and stops operated by said keys for arresting said part in different denominational positions.

18. In a computing machine, the combination of a series of levers, means for operating all of said levers, a rock shaft having a spirally arranged series of pins projecting therefrom, one pin for each lever, and adapted to be brought one at a time into a position for modifying the motion of said levers, a second series of pins arranged spirally on said rock shaft, and means coöperating with said second series of pins for setting said shaft.

19. In a computing machine, the combination of a series of register wheels, a single group of keys common to all of said wheels, and denomination selecting mechanism comprising a part movable step by step as said numeral keys are operated, a hand lever connected to move in unison with said step by step moving part and capable of manipulation to set said part, a scale associated with said lever and a pointer mounted on said lever and coöperating with said scale to indicate the denominational position in which the denomination selecting mechanism stands.

20. In a computing machine, the combination of registering mechanism, means for actuating said mechanism one denomination at a time, and denomination selecting mechanism comprising a shaft having denomination determining devices arranged spirally thereon, means for rotating said shaft, stop devices spirally arranged on said shaft, and keys and connections for arresting said shaft by any desired one of said stop devices.

21. In a combined typewriting and computing machine, the combination of typewriting mechanism including a series of printing keys, a series of type bars and connections from said keys to said type bars, computing mechanism, a special set of numeral keys for said computing mechanism, a series of transverse rock shafts operated by said special keys, and lost motion connections from said rock shafts to said connections whereby said special keys when operated operate the numeral types and whereby the ordinary numeral keys of the typewriter when operated operate said types but do not operate said computing mechanism.

22. In a computing machine, the combination of a series of register wheels, a series of rack bars normally out of position to operate said wheels but movable individually into operating position, a series of levers each arranged to guide one of said rack bars, means for operating all of said levers, and means for interposing an abutment that acts as a fulcrum for one of said levers whereby that particular lever is caused to move its rack bar into operating position.

23. In a computing machine, the combination of a series of register wheels, a series of rack bars for operating said register wheels, said rack bars normally out of operating position, a series of levers each arranged to guide one of said rack bars, means for operating all of said levers, a series of fulcrums for said levers, and means for rendering said fulcrums operative one at a time.

24. In a computing machine, the combination of a series of register wheels, a series of rack bars for said register wheels, said rack bars normally out of operating position, a series of levers each arranged to guide one of said rack bars, means for operating all of said levers, a spirally arranged series of fulcrums for said levers, and means for turning said series of fulcrums to bring one after another of said fulcrums to operative position.

25. In a computing machine, the combination of a series of register wheels, a series of rack bars for operating said register wheels, said rack bars normally out of operating position, a series of levers each arranged to guide one of said rack bars, an oscillatory member to which all of said levers are operatively connected, and means for interposing the fulcrums into operative relation with said levers selectively.

26. In a computing machine, the combination of a series of register wheels, racks for operating said wheels, a group of keys common to all denominations and arranged to operate said racks, a cam and follower operated by any of said keys, a series of levers for controlling said racks, denomination selecting mechanism including means for interposing fulcrums for said levers successively, and means operated by said follower for operating all of said levers.

27. In a computing machine, the combination of a series of register wheels, racks for operating said wheels, a group of keys common to all denominations and arranged to operate said racks, a cam and follower operated by any of said keys, a series of levers for controlling said racks, denomination selecting mechanism including means for interposing fulcrums for said levers successively, means operated by said follower for operating all of said levers, and a trip-off connection between said follower and said means.

28. In a computing machine, the combination of a series of register wheels, racks for operating said wheels, a group of keys common to all denominations and arranged to operate said racks, a cam and follower operated by any of said keys, a series of levers for controlling said racks, denomination selecting mechanism including means for interposing fulcrums for said levers successively, means operated by said follower for operating all of said levers, a trip-off connection between said means and said follower, and means for tripping said connection at the first part of the up-stroke of a key.

29. In a computing machine, the combination of a series of register wheels, racks for operating said wheels, a group of keys common to all denominations and arranged to operate said racks, a cam operated by any of said keys, connections whereby said cam brings one of said register wheels and its rack into gear in the first part of the down stroke of a key and maintains them in gear, said means including a trip-off device, and means acting on the up stroke of the key for tripping said trip-off device.

30. In a computing machine, the combination of a series of register wheels, racks for operating said wheels, a group of keys common to all denominations and arranged to operate said racks, a cam operated by any of said keys, connections whereby said cam brings one of said register wheels and its rack into gear in the first part of the down stroke of a key and maintains them in gear, said means including a trip-off device, and a pawl pivoted to said cam and acting in the first part of the up stroke of the key to trip off said device.

31. In a computing machine, the combination of a series of register wheels, racks for operating said wheels, a group of keys common to all denominations and arranged to operate said racks, a cam operated by any of said keys, a follower for said cam, a lever and connections for bringing one of said register wheels and its rack into gear, a pawl connecting said follower and said lever, and means for tripping said pawl 32. In a computing machine, the combination of a series of register wheels, racks for operating said wheels, a group of keys common to all denominations and arranged to operate said racks, a cam operated by any of said keys, a follower for said cam, step-by-step moving denomination selecting mechanism, a member common to all denominations and controlled in its action by said denomination selecting mechanism for bringing said register wheels and said racks into gear successively, and a trip-off connection between said member and said follower.

33. In a computing machine, the combination of a series of register wheels, a series of rack bars for operating said register wheels, means for operating all of said rack bars at once, and means for moving said rack bars into gear with said register wheels selectively.

34. In a computing machine, the combination of a series of register wheels, a single group of keys common to all denominations, a series of racks one for each denomination, means for operating all of said racks when one of said keys is operated, and means for bringing the register wheels and their respective racks into gear one at a time.

35. In a computing machine, the combination of a series of register wheels, a series of racks one for each wheel, a single group of keys common to all denominations, means for operating all of said racks differentially when any of said keys is depressed, guides for said racks arranged to hold said racks normally out of engagement with said wheels, and means for operating said guides one at a time to bring one of said racks into gear with its register wheel.

36. In a computing machine, the combination of a register wheel, a rack for operating said wheel, a set of numeral keys for operating said rack differentially, and means for moving said rack by said keys in one direction from normal position for addition and in the other direction from normal for subtraction.

37. In a computing machine, the combination of a group of numeral keys, a pinion operated differentially by said keys, a rack adapted to engage said pinion on one side thereof, a second rack adapted to engage said pinion on the other side thereof, means settable at will to bring either rack into engagement with said pinion, and a register wheel operated by one of said racks for addition and by the other of said racks for subtraction.

38. In a computing machine, the combination of a group of numeral keys, a pinion turned differentially by said keys, a rack having two branches, one adapted to engage said pinion on one side and the other adapted to engage said pinion on the other side, means for bringing either of said branches into engagement with said pinion, one for addition and the other for subtraction, and a register wheel operated by said rack.

39. In a computing machine, the combination of a shaft having a series of pinions thereon, a series of racks adapted to engage said pinions on one side for addition, a series of racks adapted to engage said pinions on the other side for subtraction, register wheels operated by said racks, and means for bringing either set of racks at will into engagement with said pinions.

40. In a computing machine, the combination of a register wheel, a bar having a rack thereon for operating said register wheel and said bar having two branches each with rack teeth thereon, a pinion between said branches, means for bringing said pinion into mesh with one of said branches for addition and into mesh with the other of said branches for subtraction, and means for operating said pinion differentially.

41. In a computing machine, the combination of a series of rack bars, each branched at one end and having rack teeth at the other end, register wheels adapted to be geared to said rack teeth, and each of said branches constituting a rack, a series of pinions between said branches, means for bringing all of said rack bars into engagement with said pinions on one side thereof for addition and on the other side thereof for subtraction.

42. In a computing machine, the combination of a series of rack bars, each branched at one end and having rack teeth at the other end, register wheels adapted to be geared to said rack teeth, and each of said branches constituting a rack, a series of pinions between said branches, means for bringing all of said rack bars into engagement with said pinions on one side thereof for addition and on the other side thereof for subtraction, and means for moving said rack bars one at a time into gear with said register wheels.

43. In a computing machine, the combination of a series of register wheels, a series of rack bars adapted at one end to gear with said register wheels, guides for said rack bars for moving them into and out of gear with said register wheels, two oppositely disposed racks on the other end of each of said rack bars, guides for said other ends of said rack bars for moving said rack bars transversely of the lengths of said bars, and pinions engageable by said oppositely disposed racks for operating said racks one way for addition and the other way for subtraction.

44. In a computing machine, the combination of a register wheel, a rack for operating said wheel, a set of numeral keys for operating said rack differentially, and means for moving said rack by said keys in one direction and back for addition and in the other direction and back for subtraction.

45. In a computing machine, the combination of a register wheel, a rack for operating said wheel, a set of numeral keys, differential mechanism controlled by said keys, and means whereby said mechanism causes said rack to move in one direction and back for addition and in the other direction and back for subtraction.

46. In a computing machine, the combination of a register wheel, a rack for operating said wheel, a set of numeral keys, differential mechanism movable always in the same direction and back, and means whereby said mechanism moves said rack in one direction and back for addition and in the other direction and back for subtraction.

47. In a computing machine, the combination of a register comprising a series of register wheels movable into and out of position to be operated, a series of racks for said register wheels, said series of racks normally out of operating position but movable into operating position, means for moving said register to bring said wheels into operative position, and means for moving said racks one at a time into operating position.

48. In a computing machine, the combination of a plurality of registers each comprising a series of register wheels and movable into and out of operative position, a series of racks one for each denomination and said racks common to all of said registers, and said racks movable into and out of operating position, means for moving any of said registers to operative position, means for moving any one of said racks to operating position, and means for operating said racks.

49. In a computing machine, the combination of a plurality of registers each comprising a series of register wheels and movable into and out of operative position, a series of racks one for each denomination and said racks common to all of said registers and said racks movable into and out of operating position, means for moving any of said registers to operative position, means for moving any one of said racks to operating position, and means for operating all of said racks in unison.

50. In a computing machine, the combination of a series of register wheels, means for operating said wheels one at a time, Geneva stop transfer wheels for said register wheels, a series of individual locks for holding said transfer wheels and said register wheels in engagement, and means for releasing said individual locks one at a time.

51. In a computing machine, the combination of a series of register wheels, transfer devices for said register wheels normally in engagement and adapted to lock said register wheels against operation, individual locking devices for the several transfer devices, and means for releasing said individual locking devices one at a time.

52. In a computing machine, the combination of a series of register wheels, Geneva transfer wheels for said register wheels, each of said Geneva wheels being mounted on a support so as to be movable into and out of engagement, a series of individual locks for locking said supports in normal position, means for operating said register wheels, and means for releasing said locks one at a time.

53. In a computing machine, the combination of a series of register wheels, Geneva transfer wheels for said register wheels, each of said Geneva wheels being mounted on a support so as to be movable into and out of engagement, a series of individual locks for locking said supports in normal position, means for operating said register wheels, means for unlocking the Geneva wheel that serves the particular register wheel being operated, and means for releasing all of said Geneva wheels at once.

54. In a computing machine, the combination of a series of register wheels, means for operating said register wheels one at a time, Geneva transfer wheels for said register wheels, means for releasing the particular register wheel to be operated from the Geneva wheel which serves that register wheel without releasing the remaining Geneva wheels, and means for releasing all of said Geneva wheels simultaneously to set the register to zero.

55. In a computing machine, the combination of a series of register wheels, Geneva transfer wheels for said register wheels, movable supports for said transfer wheels, locking levers pivoted to said supports for locking said supports in normal position, means for operating said register wheels, and means for moving said levers to unlock said supports one at a time.

56. In a computing machine, the combination of a series of register wheels, a series of Geneva transfer wheels for said register wheels, supports for said transfer wheels movable to move said wheels into and out of engagement, individual locking devices for holding said supports in normal position, means for operating said register wheels, said operating means being normally out of gear with said register wheels, means for bringing one of said register wheels and its operating means into gear, and means controlled by the last recited means for releasing the lock that controls the Geneva wheel that serves that particular register wheel.

57. In a computing machine, the combination of a register comprising register wheels, racks for operating said wheels, a frame in which said register is mounted, said frame being movable toward and from said operating means in a direction at right angles to the axis of said wheels, devices acting normally to lock said wheels against rotation, means for moving said racks one at a time into position to operate said wheels, means operative by the last recited means for releasing said locks one at a time, said releasing means being operative when said register frame is in its position nearest to said racks and inoperative when said register frame is in its position remote from said racks.

58. In a computing machine, the combination of a plurality of registers each comprising register wheels, racks for operating said registers, said racks being common to all of said registers, separate frames for said registers, each of said frames being movable toward and from said racks, and said racks being individually movable to and from said registers, Geneva transfer wheels for said register wheels, means for locking said transfer wheels in engagement with said register wheels, means for moving said racks individually toward said register wheels, and means operated by said moving means for releasing the Geneva wheel that serves the register wheel that the rack engages, said releasing means being operative when the register is in its position toward the racks and inoperative when said register is in its position away from the racks whereby in case only one register is in operative position its Geneva wheels will be released but the Geneva wheels of the other register or registers will not be released.

59. In a computing machine, the combination of a series of register wheels, Geneva transfer wheels for said register wheels, movable supports for said Geneva wheels, a locking lever for each of said supports, means for operating said lever to unlock said support, and means operated by a further movement of said lever for moving said support and transfer wheel away from the register wheel.

60. In a computing machine, the combination of a series of register wheels, a group of keys common to said register wheels, a shaft having a series of pinions fixed thereon, one of said pinions for each register wheel, differential mechanism for rotating said shaft by said keys, and means for gearing any one of said register wheels to its corresponding one of said pinions.

61. In a computing machine, the combination of a series of register wheels, a shaft having fixed thereon a series of pinions one for each register wheel, a series of racks for connecting the several register wheels with their respective pinions, means for rendering said racks operative one at a time, a group of numeral keys common to all denominations, and means for turning said shaft differentially by said keys.

62. In a computing machine, the combination of a series of keys, a series of levers operated by said keys and each comprising a toothed segment, a frame plate mounted adjacent the series of said segments, a key arrester in one edge of said plate in position to coöperate with the ends of said segments, and a series of full-stroke pawls pivoted on said plate and arranged to coöperate with the teeth of said segments.

63. In a computing machine, the combination of a series of keys, a series of levers mounted co-axially and each comprising a toothed segment, a plate mounted adjacent said segments and having one edge thereof formed into a slotted tube, key arresting devices in said tube, and a series of full-stroke pawls pivoted to said plate and adapted to coöperate with the teeth of said segments.

64. In a computing machine, the combination of a series of keys, a co-axially arranged series of levers operated by said keys, each of said levers comprising a toothed segment and a cam, a frame plate mounted adjacent said segments and having a key arrester at one edge thereof, a series of full stroke pawls pivoted to said plate and arranged to coöperate with the teeth of said segments, and a differentially movable element operated by said cams.

Signed at Grand Rapids, in the county of Kent and State of Michigan this 15th day of August A. D. 1911.

GLENN J. BARRETT.

Witnesses:
ELI R. KLAASSE,
HELEN M. NEWTON.

---

Copies of this patent may be obtained for five cents each, by addressing the "Commissioner of Patents, Washington, D. C."